March 9, 1971  JEAN-LOUIS CRUSET ET AL  3,568,385
PRESTRESSED CONCRETE PRESSURE VESSEL FOR NUCLEAR REACTORS
Filed July 1, 1968  3 Sheets-Sheet 1

United States Patent Office 3,568,385
Patented Mar. 9, 1971

3,568,385
PRESTRESSED CONCRETE PRESSURE VESSEL FOR NUCLEAR REACTORS
Jean-Louis Cruset, Paris, Pierre Launay, Versailles, and Jacques Lemasson, Marly le Roy, France, assignors to Commissariat a l'Energie Atomique, Paris, France
Filed July 1, 1968, Ser. No. 741,422
Claims priority, application France, July 3, 1967, 112,908
Int. Cl. E04c 3/10
U.S. Cl. 52—224          10 Claims

ABSTRACT OF THE DISCLOSURE

At least one of the ends of the pressure vessel is pierced by an opening delimited by two successive frusto-conical faces which are flared towards the exterior. In order to close the opening, a slab of corresponding shape is applied against the first face or internal face and a series of wedge-shaped elements are clamped both against said first face and against the second face of the opening by means of rectilineal cables which are passed right through the wedge elements and the pressure vessel wall. Peripheral prestressing cables serve to complete the forcible application of the slab and wedge elements against the vessel cylinder so as to form a tight pressure-resistant assembly. No relative displacement between the different components need be feared at the time of approach to full pressure within the pressure vessel or during operation of the reactor.

---

The present invention is concerned with a prestressed concrete pressure vessel for nuclear reactors and more especially with a pressure vessel in which an opening of large size is formed.

In reactors at present in construction or under design, provision must be made in practice for the possibility of carrying out servicing operations on any of the reactor internals which are located within the pressure vessel. Such operations may include the insertion of components and even bulky components, the replacement of faulty elements which may even be carried out periodically in some types of reactor.

This invention is intended to permit and to facilitate the servicing operations referred-to by making it possible to provide almost complete freedom of access to the chamber which is formed within the reactor.

This invention is therefore directed to a prestressed concrete pressure vessel comprising a cylinder, an opening pierced in one of the ends of said cylinder and taking up practically the entire area of said cylinder end, two successive inclined and outwardly-flared faces which serve to limit said opening, a removable slab having a peripheral surface which corresponds in shape to the first internal face of the opening and applied against said face, a plurality of wedge-shaped elements which are adapted to rest on the outer surface of said slab, tensioned rectilineal cables which pass through the thickness of the wedge-shaped elements and of the cylinder so as to maintain said elements forcibly applied against said second wall of said opening and against said slab and cables for applying circular prestress to the pressure vessel as a whole.

As will be readily apparent, the opening of the cylinder can be located at the top or bottom of the pressure vessel. When the pressure vessel is of the horizontal axis type, the cylinder opening can be located in one of the two lateral walls. Alternatively, an opening can even be formed at each end of the pressure vessel.

Whatever may be the position of the vessel end or ends which are provided with said opening, the interior of the reactor can thus be freed almost entirely. Any component, regardless of its volume, can accordingly be either inserted in or withdrawn from said opening.

Leak-tightness of the pressure vessel is ensured by means of a membrane which lines the internal wall of the vessel cylinder, which is joined to a membrane forming a lining for the slab, which is separated from said slab-membrane at the time of opening but which is joined thereto at the moment of closure whilst resistance to pressure and biological protection are ensured by the assembly which is formed by the slab and the wedge elements which are clamped against this latter and against the vessel cylinder, said assembly being rigidly coupled with said cylinder.

The pressure vessel as thus constituted therefore retains its entire effectiveness irrespective of the size of its opening and the frequency of utilization of this latter.

A number of other properties and advantages of the invention will in any case become apparent from the following detailed description of one embodiment which is given by way of non-limitative example, reference being made to the accompanying drawings, in which:

FI. 1 is a partial longitudinal sectional view of a pre-stressed concrete pressure vessel;

Figure 1:
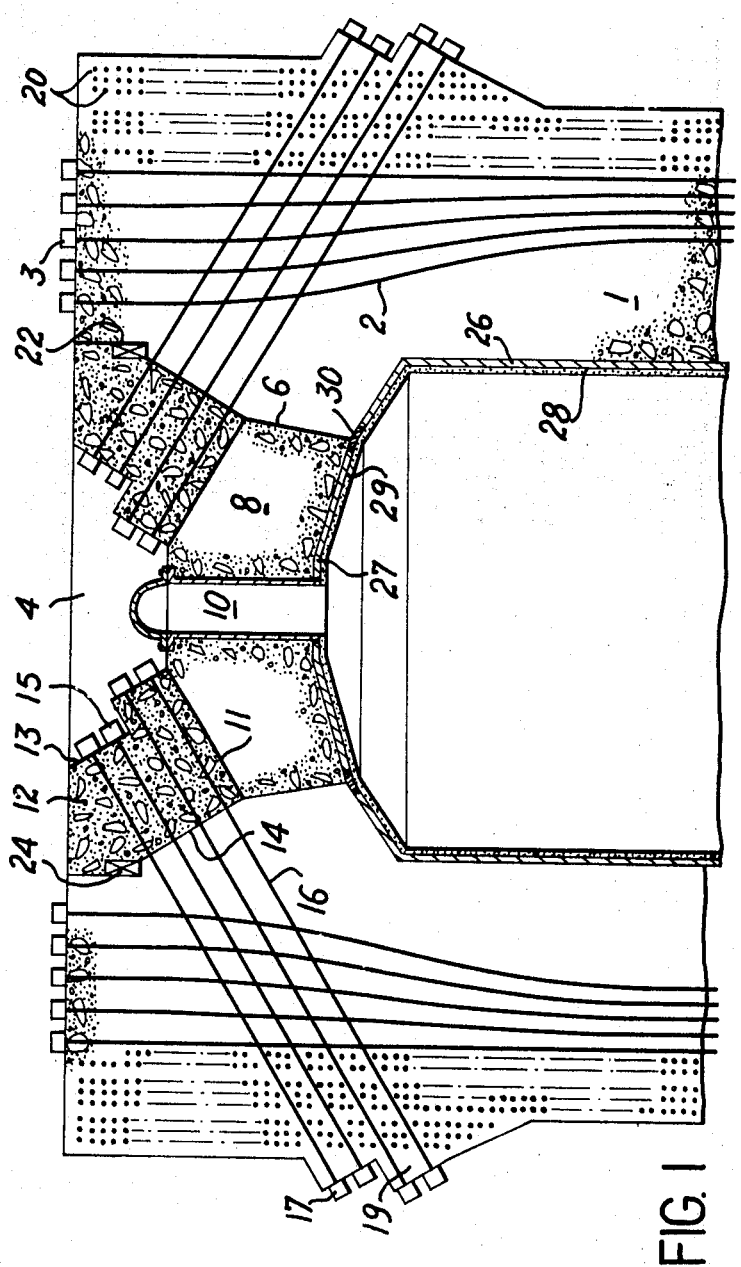

In FIG. 1, there is simply shown one half of the pressure vessel, the second half being similar to the first or constructed in known manner.

Said pressure vessel comprises a substantially cylindrical or prismatic cylinder 1 formed of concrete and traversed by longitudinal prestressing tie-rods 2 which are anchored at 3 on each end face of the cylinder 1.

The end-wall of said cylinder is pierced by an opening 4, the lateral wall of which is flared outwards from the interior and which takes up practically the entire area of the vessel end. Said opening comprises a first portion having a substantially conical or prismatic wall 6 followed by a second portion 14 which is also conical or prismatic but is inclined at a larger angle of slope than that of the first portion 6.

There is applied against said first portion or bearing face 6 of the opening 4 a slab 8 whose outer surface corresponds to that of said bearing face 6. In the same manner as the vessel cylinder as a whole, said slab is preferably fabricated from concrete and a servicing passage 10 is pierced at the center of said slab, said passage being preferably closed by a removable seal plug which is not shown in the drawings.

The top face 11 of the slab 8 has substantially the shape of a cone frustum or of a pyramid frustum and is intended to support a plurality of wedge elements 12 which are eight in number, for example, and which have substantially the shape of ring segments. Each wedge element 12 is applied on one side against the top face 11 of the slab 8 and on the other side against the second portion or abutment face 14 of the opening 4.

Rectilineal cables 16 which are preferably at right angles to the face 14 are intended to apply said wedge elements 12 both against the face 14 and against the face 11 of the slab. Said cables pass through the entire thickness of the wedge elements 12 and of said cylinder 1 and are retained at each end by heads 15, 17 which are applied respectively against abutments 19 formed on the outer wall of the vessel cylinder and on the inner wall 13 of each wedge element 12, said wall being preferably constituted by a plurality of parallel surfaces displaced relative to each other. The cables can be disassembled and are placed, for example, within sheaths which are first placed within the concrete of the cylinder and of the wedge element. Moreover, the heads 15, 17 can be adjusted in such a manner as to permit tensioning of the cables according to the force to be applied to the wedge elements 12.

Figure 2:
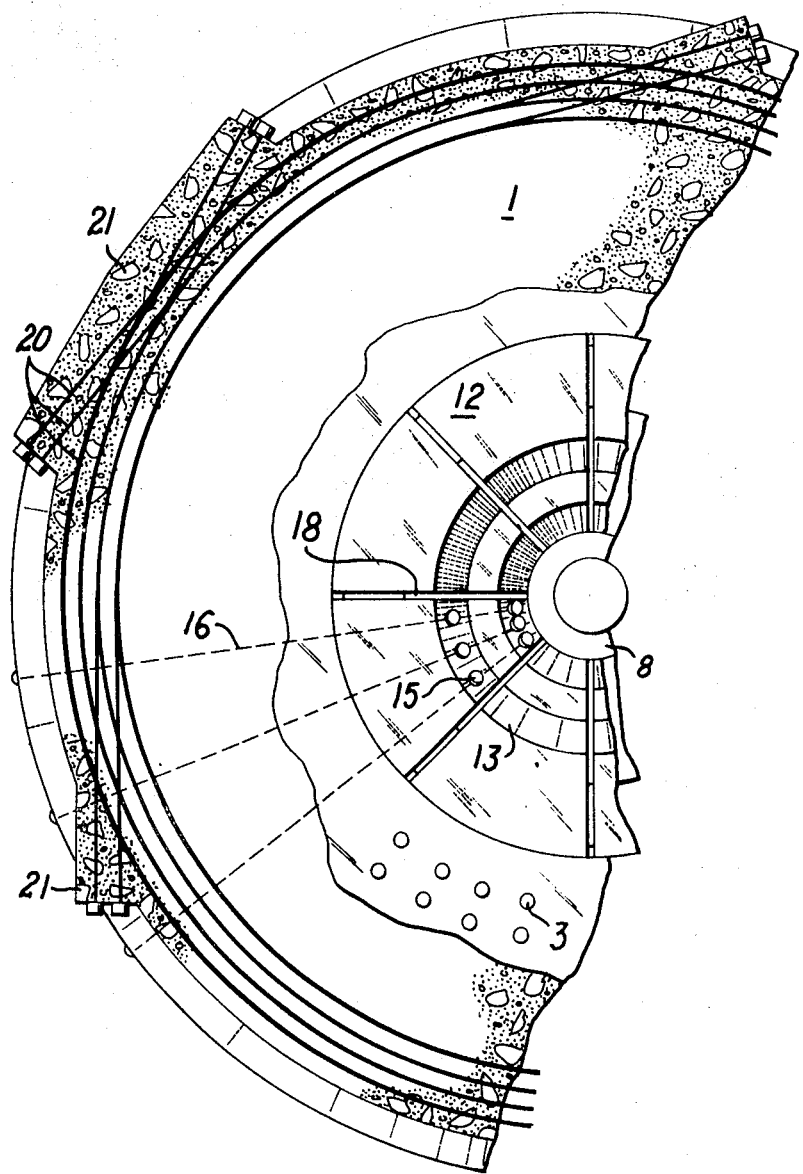
FIG. 2 is a partial diagrammatic overhead view of said pressure vessel.

There is formed between the wedge elements 12 a small space 18 (as shown in FIG. 2) so as to facilitate assembly. But when the pressure vessel is closed, said wedge elements are restrained laterally by the action of circular-prestressing cables 20 which surround the cylinder 1 and are anchored to projecting abutments 21 formed on the periphery of said cylinder as shown in FIG. 2.

In order to permit adjustment of the tension applied to said cables 20 and above all to permit a reduction in said tension during the period of opening of the pressure vessel, said cables 20, as the cables 16 and tie-rods 2, are not grouted in the concrete and are preferably placed in sheaths which permit of free motion.

The surfaces of the wedge elements 12 which are in contact with the abutment face 14 as well as the outer surface of the slab 8 which is applied against the bearing face 6 have sufficient smoothness and strength to ensure that no damage is liable to be caused at the time of tensioning of the cables 16, 20 and 2, even when the tensioning operation has to be repeated a certain number of times. This state of surface can be obtained either by treatment of the concrete in the mass or by covering with steel or with a synthesis material or both, or by any other suitable means.

Inside the pressure vessel, the cylinder 1 is lined with a leak-tight membrane 26 which is protected internally by a heat-insulating covering 28. Similarly, the internal surface of the slab 8 is lined with a leak-tight membrane 27 which is protected by a heat-insulating covering 29. The lining membrane 27 is joined to the membrane 26 in leak-tight manner, for example by means of a jointing band 30 which is welded to each of the two membranes or by any other means for achieving the requisite standard of leak-tightness.

Closure of the pressure vessel is carried out by introducing the slab 8 which is retained by the bearing face 6, then by placing the wedge elements 12 in position on said slab and against the face 14 of the opening 4. Even before the introduction of the slab, there will preferably have been established within the concrete a longitudinal and circular prestress corresponding to the forces which are developed in the pressure vessel structure at the time of construction and when the reactor is not in service.

The leak-tight lining membrane 27 of the slab 8 is then fastened to the membrane 26, for example by welding the band 30, the heat-insulating covering being then joined inside said membrane.

The cables 16 are then inserted in the wedge elements 12 and cylinder 1 and tensioned to the stress which is necessary to ensure that a complete and leak-tight contact is established between the wedge elements and the face 14 of the cylinder on the one hand and the face 11 of the slab on the other hand.

The peripheral cables 20 are then tensioned to a sufficient stress to maintain the wedge elements 12 applied against the slab 8 with a force which is sufficient to withstand the high pressure existing within the pressure vessel during operation of the reactor. The tie-rods 2 are also tensioned in such a manner as to provide the pressure vessel with a sufficient value of longitudinal prestress. These different operations of tensioning of the cables 16, 2 and 20 are carried out in accordance with a program which is such that the stresses induced at any given point of the pressure vessel do not at any time exceed permissible values.

After leak-tight closure of the passage 10 by means of a seal plug, the pressure vessel is in readiness for use or may in other words be pressurized.

The slab 8 and the wedge elements 12 have been rigidly coupled with the cylinder 1 as a result of the tension of the rectilineal cables 16 and peripheral cables 20 and are thus applied by these latter in tight contact with the surfaces 6, 11 and 14. No relative displacement of these components need therefore be feared. When the pressure rises within the pressure vessel, said components react in the same manner as the vessel cylinder itself and the resultant stresses are transmitted by said contact faces 6, 11 and 14 which are preferably not flat.

Figure 3:
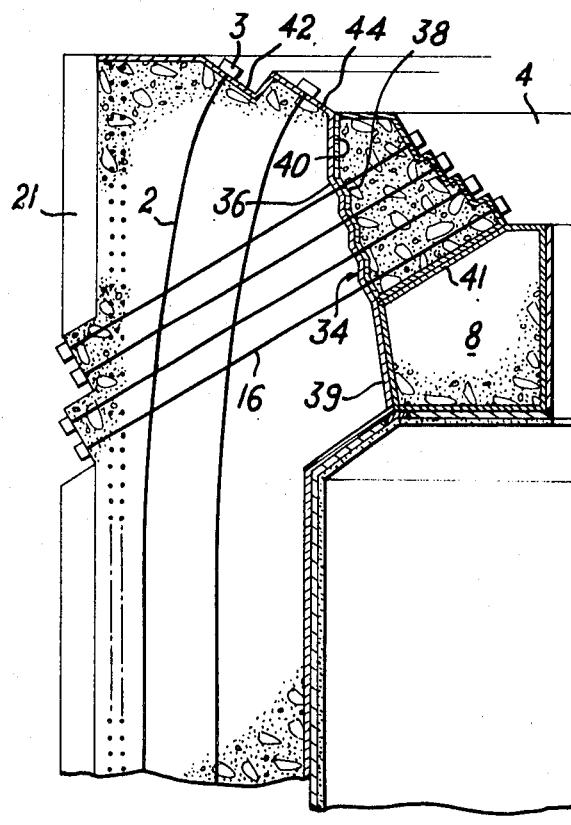
FIG. 3 is a partial longitudinal sectional view of an alternative embodiment of said pressure vessel.

In an alternative embodiment which is shown in FIG. 3, the surface 34 against which the wedge elements 12 are abuttingly applied is even constituted by a series of annular ribs 36 whilst said wedge elements 12 are provided with a series of ribs 38 of corresponding shape. The wedge elements can be accurately centered on the wall 36 and maintained in intimate contact therewith by means of said ribs which additionally serve to provide imperviousness to radioactive radiations.

The contact surfaces can also be constituted simply by the surface of the concrete or they may alternatively be formed by a steel lining 40 placed around the concrete which constitutes the wedge element and even by a steel lining 39 which covers the internal wall of the vessel cylinder; the slab 8 can also be fitted with a lining 41 of the same type.

When it proves necessary for any reason to carry out a servicing operation within the pressure vessel, either for the purpose of replacing or inspecting an internal component or for the purpose of introducing a component, the prestressing cables 20, 16 and 2 are slackened off and the rectilineal cables 16 are withdrawn, thereby releasing the wedge elements 12 and permitting the extraction of these latter. The passage 10 is then opened and the two lining-membrane elements 26 and 27 are separated, for example by cutting through the weld which retains the band 30 or by removal of the equivalent jointing system. The slab 8 is then removed and the opening 4 is left completely free and unobstructed.

In order to facilitate the extraction of the wedge elements 12, the top portion of the opening 4 as well as the top portion of the wedge elements 12 is preferably constituted by a cylindrical wall 22 as shown in FIG. 1 but the wedge elements 12 are provided with a recess so as to form between the two walls a housing in which jacks 24 are placed.

At the top portion of the vessel cylinder, the surface against which the heads 3 of the longitudinal prestressing tie-rods 2 are applied can comprise a number of stepped recesses 42, 44 which serve as abutments for said heads 3.

Whenever it should prove necessary to do so, the pressure vessel can thus be opened over virtually the entire end-wall area for the purpose of introducing or withdrawing components which may even be of large size. The presence of this openable end structure does not in any way affect either the efficiency or the strength of the pressure vessel.

As will be readily apparent, it would not constitute a departure from the scope of the invention to make a number of alternative modifications in the forms of construction which have been described in the foregoing. For example, the lining membranes 26 and 27 could be joined together by any suitable means and sealing members could alternatively or additionally be fitted between the contacting surfaces.

What we claim is:

1. A prestressed concrete pressure vessel comprising a cylinder, an opening pierced in one of the ends of said cylinder and taking up practically the entire area of said cylinder end, two successive inclined and outwardly-flared faces which delimit said opening, a removable slab having a peripheral surface which corresponds in shape to the first internal surface of the opening and applied against said face, a plurality of wedge-shaped elements which are adapted to rest on the outer surface of said slab, tensioned rectilineal cables which pass through the thickness of the wedge-shaped elements and of the cylinder so as to clamp said elements against the second face of the opening and against said slab and cables for applying circular prestress to the pressure vessel as a whole.

2. A pressure vessel according to claim 1, wherein the outer surface of the slab is frusto-conical.

3. A pressure vessel according to claim 1, wherein the contact surface of the wedge-shaped elements and of the vessel cylinder is constituted by a succession of annular ribs.

4. A pressure vessel according to claim 1, wherein the internal surfaces of the wedge-shaped elements comprise a succession of stepped recesses for supporting the heads of the clamping cables and at right angles to the direction of said cables.

5. A pressure vessel according to claim 1, wherein the wedge-shaped elements comprise a peripheral recess which delimits with the vessel cylinder housings for jacks which are intended to lift said wedge-shaped elements.

6. A pressure vessel according to claim 1, wherein the slab and the vessel cylinder are covered with a leak-tight lining membrane inside the pressure vessel, the two lining membranes being joined together by means of a connecting member.

7. A pressure vessel according to claim 1, wherein the slab is formed of concrete.

8. A pressure vessel according to claim 1, wherein the slab is formed of concrete and covered with a steel lining.

9. A pressure vessel according to claim 1, wherein the wedge-shaped elements are formed of concrete.

10. A pressure vessel according to claim 1, wherein the wedge-shaped elements are formed of concrete and lined with sheet steel.

References Cited

UNITED STATES PATENTS

| 307,155 | 10/1884 | Williams | 52—89 |
| 1,866,517 | 7/1932 | Heylandt | 114—74A |
| 1,909,502 | 5/1933 | Reinecke et al. | 220—3 |
| 3,397,503 | 8/1968 | Adler | 52—249 |

FOREIGN PATENTS

| 261,515 | 11/1961 | Australia | 52—224 |

FRANK L. ABBOTT, Primary Examiner

J. L. RIDGILL, JR., Assistant Examiner

U.S. Cl. X.R.

52—89, 245; 220—3; 292—256.71